United States Patent
Faller et al.

(10) Patent No.: US 11,236,944 B2
(45) Date of Patent: *Feb. 1, 2022

(54) METHOD AND SYSTEM FOR FURNACE SEALING

(71) Applicant: AMEC FOSTER WHEELER USA CORPORATION, Houston, TX (US)

(72) Inventors: Alfred J. Faller, Hampton, NJ (US); Pasquale J. Giovannone, Hampton, NJ (US)

(73) Assignee: AMEC FOSTER WHEELER USA CORPORATION, Houston, TX (US)

( * ) Notice: Subject to any disclaimer, the term of this patent is extended or adjusted under 35 U.S.C. 154(b) by 181 days.

This patent is subject to a terminal disclaimer.

(21) Appl. No.: 16/671,673

(22) Filed: Nov. 1, 2019

(65) Prior Publication Data
US 2020/0064072 A1   Feb. 27, 2020

Related U.S. Application Data

(63) Continuation of application No. 15/849,144, filed on Dec. 20, 2017, now Pat. No. 10,488,116, which is a
(Continued)

(51) Int. Cl.
*F27D 99/00* (2010.01)
*F16J 15/02* (2006.01)
(Continued)

(52) U.S. Cl.
CPC ........ *F27D 99/0073* (2013.01); *F16J 15/022* (2013.01); *F16J 15/3288* (2013.01);
(Continued)

(58) Field of Classification Search
CPC ....... F16L 5/02; F16L 5/10; F16J 15/02; F16J 15/022; F16J 15/024; F16J 15/3268;
(Continued)

(56) References Cited

U.S. PATENT DOCUMENTS 2,370,782 A   3/1945   Donahue
3,458,208 A   7/1969   Jung
(Continued)

FOREIGN PATENT DOCUMENTS

EP   1347218 A2   9/2003
GB   133836 A    10/1919

OTHER PUBLICATIONS

AirGuard® Circular Brush Grommet GTAG5R, Custom Plastic Distributors, Inc. (2013).
(Continued)

*Primary Examiner* — Nicholas L Foster
(74) *Attorney, Agent, or Firm* — Winstead PC

(57) ABSTRACT

The present invention relates generally to furnace systems and more particularly, but not by way of limitation, to a split-ring assembly for sealing a junction between a catalyst tube and a furnace. In one aspect, the present invention relates to a ring-seal assembly. The ring-seal assembly includes a housing ring coupled to an outer surface of a furnace. The housing ring is disposed around a circumference of a tube proximate a junction with the furnace. The ring seal assembly further includes a brush seal that is at least partially disposed within the housing ring. The brush seal is disposed around the circumference of the tube. A plurality of brushes extend radially inwardly from the brush seal towards the tube.

11 Claims, 4 Drawing Sheets

Related U.S. Application Data continuation of application No. 14/540,266, filed on Nov. 13, 2014, now Pat. No. 10,036,595.

(60) Provisional application No. 61/903,770, filed on Nov. 13, 2013.

(51) Int. Cl.
*F16L 5/10* (2006.01)
*F16J 15/3288* (2016.01)
*F16J 15/3268* (2016.01)

(52) U.S. Cl.
CPC .............. *F16L 5/10* (2013.01); *F16J 15/3268* (2013.01); *F27D 2099/0081* (2013.01)

(58) Field of Classification Search
CPC .... F16J 15/3288; F05D 2240/56; H02G 3/22; F27D 99/0073; F27D 2099/0081
See application file for complete search history.

(56) References Cited

U.S. PATENT DOCUMENTS

| | | | |
|---|---|---|---|
| 4,315,486 A | 2/1982 | Seeman et al. | |
| 4,924,817 A | 5/1990 | Seelen | |
| 5,090,710 A | 2/1992 | Flower | |
| 5,137,078 A | 8/1992 | Borowy | |
| 5,176,389 A * | 1/1993 | Noone | F16J 15/3288 277/355 |
| 6,105,966 A | 8/2000 | Turnquist et al. | |
| 6,679,500 B1 | 1/2004 | Maurer et al. | |
| 6,880,829 B1 * | 4/2005 | Datta | F16J 15/3288 277/350 |
| 10,036,595 B2 * | 7/2018 | Faller | F16J 15/022 |
| 10,488,116 B2 * | 11/2019 | Faller | F16L 5/10 |
| 2003/0178778 A1 | 9/2003 | Szymbor et al. | |
| 2004/0119237 A1 | 6/2004 | Datta | |
| 2006/0125190 A1 | 6/2006 | Addis | |
| 2007/0063448 A1 | 3/2007 | Kowalczyk | |
| 2008/0296846 A1 | 12/2008 | Daggett et al. | |
| 2013/0020770 A1 | 1/2013 | Hamilton et al. | |
| 2013/0094957 A1 * | 4/2013 | Mindock, III | F02C 7/28 415/230 |
| 2013/0146695 A1 | 6/2013 | Maurer et al. | |
| 2013/0277918 A1 | 10/2013 | Fitzgerald et al. | |
| 2015/0130140 A1 * | 5/2015 | Faller | F16J 15/3288 277/314 |
| 2018/0112920 A1 * | 4/2018 | Faller | F27D 99/0073 |

OTHER PUBLICATIONS

Copenheaver, Blaine R., International Search Report for PCT/2014/065373, dated Feb. 24, 2015 (1 page).

* cited by examiner

METHOD AND SYSTEM FOR FURNACE SEALING

CROSS-REFERENCE TO RELATED APPLICATIONS

This application is a continuation of U.S. patent application Ser. No. 15/849,144, filed on Dec. 20, 2017. U.S. patent application Ser. No. 15/849,144 is a continuation of U.S. patent application Ser. No. 14/540,266, filed on Nov. 13, 2014. U.S. patent application Ser. No. 14/540,266 claims priority to U.S. Provisional Patent Application No. 61/903,770, filed Nov. 13, 2013. U.S. patent application Ser. No. 15/849,144, U.S. patent application Ser. No. 14/540,266, and U.S. Provisional Patent Application No. 61/903,770 are each incorporated herein by reference.

BACKGROUND

Field of the Invention

The present application relates generally to furnace systems and more particularly, but not by way of limitation, to a split-ring assembly for sealing a junction between a catalyst tube and a furnace.

History of the Related Art

Furnaces used in the refining and petro-chemical industries are designed to operate with interior temperatures in excess of 1600 degrees Fahrenheit. Factors of economy and safety dictate the these interior temperatures be controlled with a high degree of precision. It is thus, imperative that any penetration of ambient air into the interior of the furnace and leakage of heat and hot flue gases from the furnace be minimized with a sealing device.

In many cases, the area near the top of the furnace is a primary location for leakage of flue gases and furnace heat. The area near the top of the furnace is highly congested with numerous hardware including, for example, catalyst tubes, catalyst tube flanges, inlet piping, tube-support assemblies, and associated hardware. Such congestion limits the space available for installation of a sealing device. Because furnace components and associated hardware are often metallic, any sealing device must allow vertical growth, due to thermal expansion, of, for example, a catalyst tube. In addition, a sealing device must facilitate installation and replacement without altering or removing the associated hardware.

SUMMARY

The present invention relates generally to furnace systems and more particularly, but not by way of limitation, to a split-ring assembly for sealing a junction between a catalyst tube and a furnace. In one aspect, the present invention relates to a ring-seal assembly. The ring-seal assembly includes a housing ring coupled to an outer surface of a furnace. The housing ring is disposed around a circumference of a tube proximate a junction with the furnace. The ring seal assembly further includes a brush seal that is at least partially disposed within the housing ring. The brush seal is disposed around the circumference of the tube. A plurality of brushes extend radially inwardly from the brush seal towards the tube.

In another aspect, the present invention relates to a method of sealing a junction between a tube and a furnace. The method includes installing housing ring to an outer surface of a furnace. The housing ring is installed about a circumference of a tube proximate a junction with the furnace. The method further includes installing a brush seal around the circumference of the tube. The brush seal is at least partially disposed within the housing ring. A plurality of brushes extending radially inwardly from the brush seal and contact an outer surface of the tube. The brush seal is seated within the housing ring.

BRIEF DESCRIPTION OF THE DRAWINGS

For a more complete understanding of the present invention and for further objects and advantages thereof, reference may now be had to the following description taken in conjunction with the accompanying drawings in which.

DETAILED DESCRIPTION

Various embodiments of the present invention will now be described more fully with reference to the accompanying drawings. The invention may, however, be embodied in many different forms and should not be construed as limited to the embodiments set forth herein.

Figure 1:
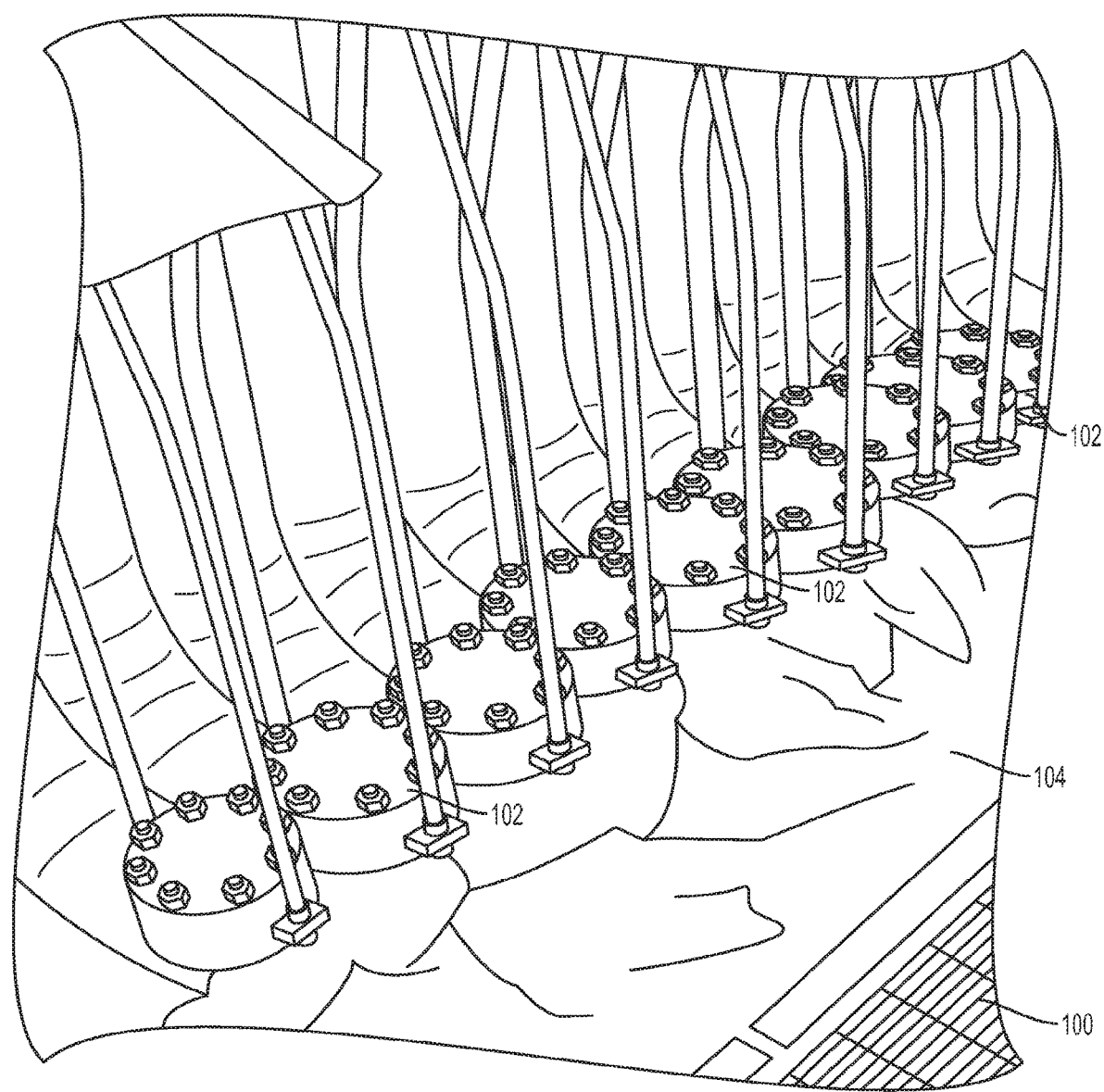
FIG. 1 is a perspective view of a prior-art catalyst tube arrangement.

FIG. 1 is a perspective view of a prior-art catalyst tube arrangement. A furnace 100 includes a plurality of catalyst tubes 102 extending outwardly therefrom. A fabric seal 104 is placed around each tube of the plurality of catalyst tubes near a junction with an outer wall of the furnace 100. The fabric seal 104 is flexible and must be installed with sufficient slack to allow room for thermal expansion of the plurality of catalyst tubes 102 during operation. The excess material required to accommodate thermal expansion is constrained by available space thus making installation and maintenance difficult.

Figures 2, 3:
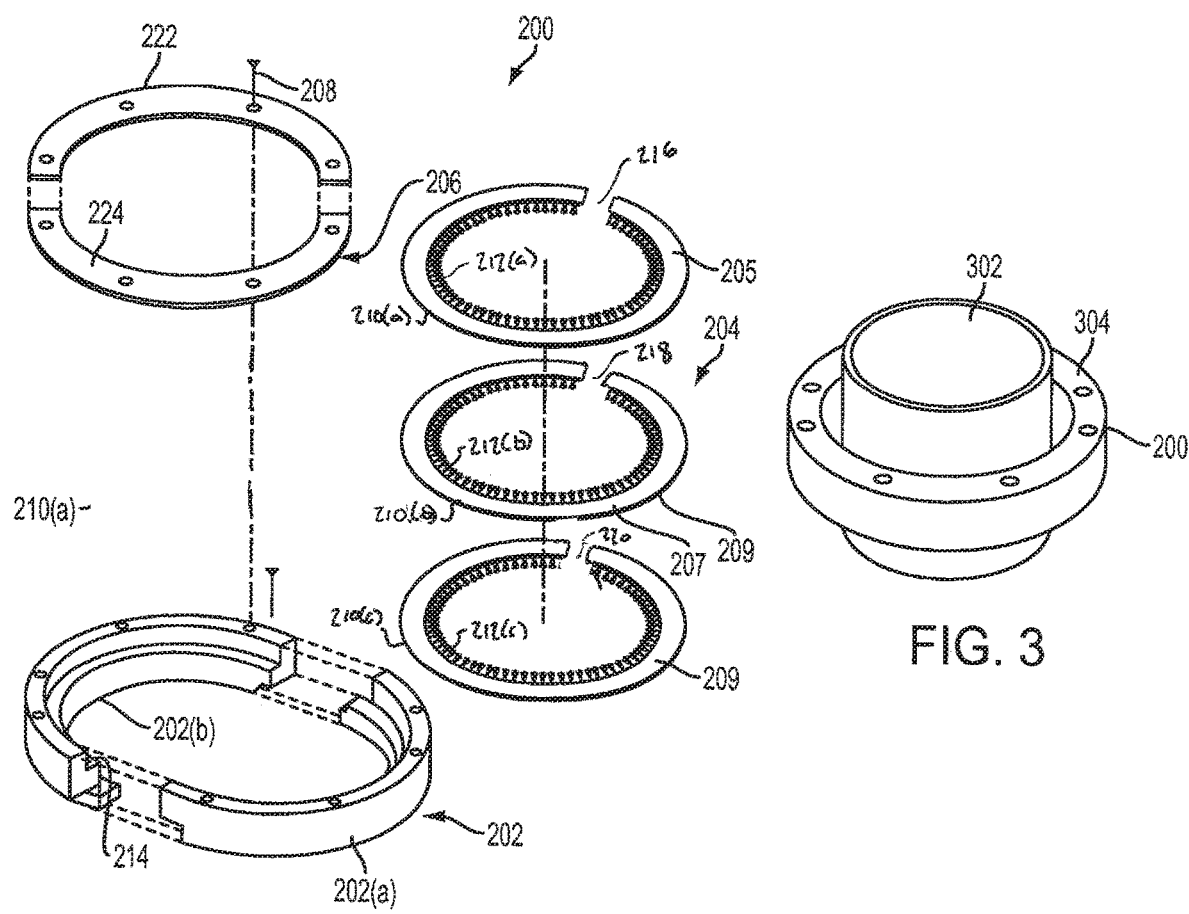
FIG. 2 is an exploded view of a ring seal according to an exemplary embodiment.
FIG. 3 is a perspective view of the ring seal of FIG. 2 in an installed configuration according to an exemplary embodiment.

FIG. 2 is an exploded view of a ring seal 200. The ring seal 200 includes a brush seal 204 that is disposed between a housing ring 202 and a retaining ring 206. The housing ring 202 includes a first split-ring section 202(*a*) coupled to a second split-ring section 202(*b*). In other embodiments, however, ring seals utilizing principles of the invention may include a single-piece housing ring or a hinged housing ring. A rabbet 214 is formed around an interior circumference of the first split-ring section 202(*a*) and the second split-ring section 202(*b*).

Still referring to FIG. 2, the brush seal 204 includes a first brush-seal ring 205, a second brush-seal ring 207, and a third brush-seal ring 209 disposed within the housing ring 202. In other embodiments, however, ring seals utilizing principles of the invention may include any number of brush-seal rings. The first brush-seal ring 205 includes a first joint 216, the second brush-seal ring 207 includes a second joint 218, and the third brush-seal ring 209 includes a third joint 220. When installed, the first brush-seal ring 205, the second brush-seal ring 207, and the third brush-seal ring 209 are arranged such that the first joint 216, the second joint 218, and the third joint 220 are staggered such that the first joint 216, the second joint 218, and the third joint 220 are not aligned thereby inhibiting transmission of gases through the first joint 216, the second joint 218, and the third joint 220.

Still referring to FIG. 2, the first brush-seal ring 205 includes support ring 210(a) and a plurality of brushes 212(a) extending radially inwardly from the support ring 210(a). The second brush-seal ring 207 includes support ring 210(b) and a plurality of brushes 212(b) extending radially inwardly from the support ring 210(b). The third brush-seal ring 209 includes support ring 210(c) and a plurality of brushes 212(c) extending radially inwardly from the support ring 210(c).

Still referring to FIG. 2, the retaining ring 206 is disposed above the brush seal 204. The retaining ring 206 includes a first section 222 and a second section 224. In other embodiments, however, ring seals utilizing principles of the invention may include a single-piece retaining ring or a hinged retaining ring. The retaining ring 206 is secured to the housing ring 202 by a plurality of screws 208 thereby securing the brush seal 204 between the housing ring 202 and the retaining ring 206.

FIG. 3 is a perspective view of the ring seal 200 in an installed configuration. The ring seal 200 is secured around a circumference of an outer wall 304 of a tube 302 at a junction between the tube 302 and a furnace arch or a furnace roof (not shown in FIG. 3). In a typical embodiment, the tube 302 is, for example, a catalyst tube; however, in other embodiments, the ring seal 200 may be used to seal any type of furnace-inlet or furnace-outlet tube.

Referring to FIGS. 2-3, the first brush-seal ring 205, the second brush-seal ring 207, and the third brush-seal ring 209 are secured within the housing ring 202. The brushes 212(a)-(c) extend radially inwardly from the support rings 210(a)-(c) and contact the outer wall 304 of the tube 302 thereby inhibiting the transmission of gases between the outer wall 304 and the ring seal 200. The tube 302, however, is not connected to the brushes 212(a)-(c). Thus, the tube 302 may move, for example, in an axial direction relative to the ring seal 200. Such movement of the tube 302 may be, for example, due to thermal expansion and/or thermal contraction of the tube 302.

Figure 4A:
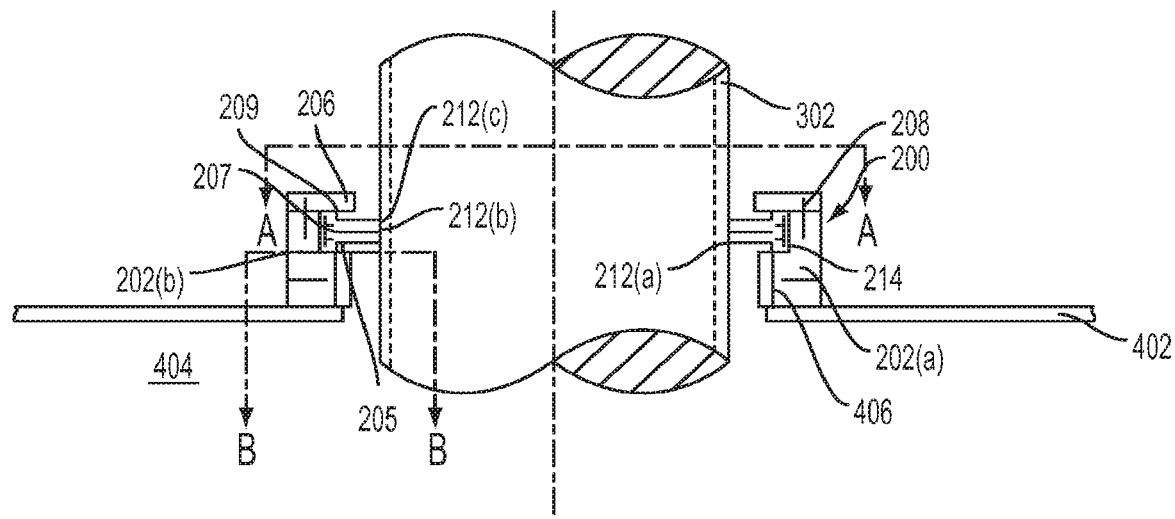
FIG. 4A is a cross-sectional view of the ring seal of FIG. 2 in an installed configuration according to an exemplary embodiment.
Figure 4B:
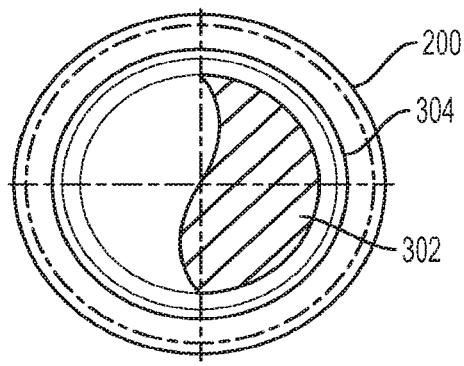
FIG. 4B is a top view of the ring seal of FIG. 2 in an installed configuration according to an exemplary embodiment.

FIG. 4A is a cross-sectional view of the ring seal of 200 in an installed configuration. FIG. 4B is a top view of the ring seal 200 in an installed configuration. Referring to FIGS. 4A and 4B, the first split-ring section 202(a) is coupled to the second split-ring section 202(b) to form the housing ring 202 around the outer wall 304 of the tube 302. Use of the first split-ring section 202(a) and the second split-ring section 202(b) allows the ring seal 200 to be utilized with existing furnaces without need for significant equipment removal. The housing ring 202 is secured to an outer wall 402 of a furnace 404 via a process such as, for example, welding, brazing, or the like.

Still referring to FIGS. 4A and 4B, the first brush-seal ring 205, the second brush-seal ring 207, and the third brush-seal ring 209 are disposed within the housing ring 202 above the rabbet 214. The brushes 212(a)-(c) extend radially inwardly from the support rings 210(a)-(c) and contact the outer wall 304 of the tube 302 thereby inhibiting the transmission of gases between the outer wall 304 of the tube 302 and the ring seal 200. The tube 302, however, is not connected to the brushes 212(a)-(c). Thus, the tube 302 may move, for example, in an axial direction relative to the ring seal 200. Such movement of the tube 302 may be, for example, due to thermal expansion and/or thermal contraction of the tube 302. The retaining ring 206 is positioned above the first brush-seal ring 205, the second brush-seal ring 207, and the third brush-seal ring 209. The retaining ring is secured to the housing ring 202 by the plurality of screws 208.

Figure 5:
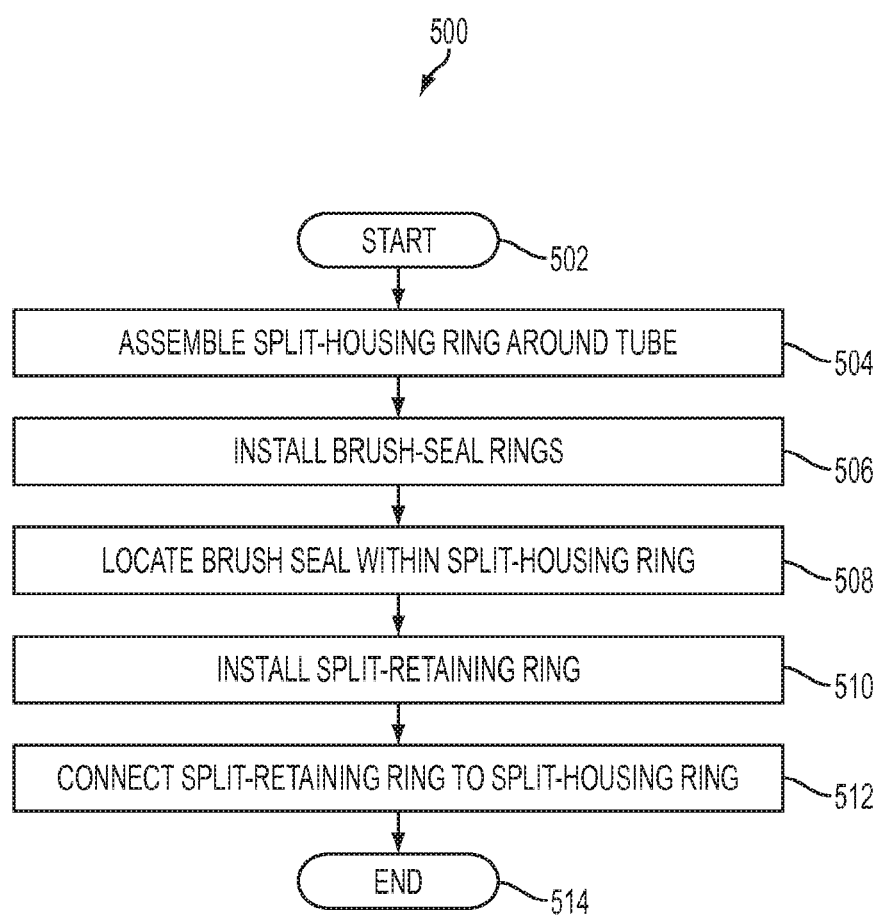
FIG. 5 is a flow diagram of a process for sealing a catalyst tube according to an exemplary embodiment.

FIG. 5 is a flow diagram of a process 500 for sealing a catalyst tube. The process 500 starts at step 502. At step 504, the first split-ring section 202(a) and the second split-ring section 202(b) are assembled around a base region of the tube 302. The first split-ring section 202(a) and the second split-ring section 202(b) are coupled together to form the housing ring 202 via the screws 406. Use of the first split-ring section 202(a) and the second split-ring section 202(b) allow the housing ring 202 to be installed without removal or alteration of the tube 302 or the furnace 404. At step 506, the first brush-seal ring 205, the second brush-seal ring 207, and the third brush-seal ring 209 are wound around the outer wall 304 of the tube 302 to form the brush seal 204. The first joint 216, the second joint 218, and the third joint 220 are arranged in a staggered configuration such that the first joint 216, the second joint 218, and the third joint 220 are not aligned. Such a configuration improves the sealing properties of the brush seal 204 by inhibiting transmission of gas through the first joint 216, the second joint 218, and the third joint 220. At step 508, the brush seal 204 is disposed within the housing ring 202 and seated on the rabbet 214. At step 510, the first section 222 and the second section 224 are secured around the tube 302. The first section 222 and the second section 224 are coupled to each other to form the retaining ring 206. At step 512, the retaining ring 206 is secured to the housing ring 202 via the plurality of screws 208. The process 500 ends at step 514.

Referring now to FIGS. 2-5, during operation, the brush seal 204 creates a sufficient barrier so as to inhibit infiltration of ambient air into the furnace 404 as well as to inhibit escape of flue gas from the furnace 404. The plurality of brushes 212(a)-(c) contain many bristles that create a tortuous flow path for escape of internal heat and flue gases from the furnace 404. Further, use of the first brush-seal ring 205, the second brush-seal ring 207, and the third brush-seal ring 209 creates multiple air layers around the perimeter of the tube 302. The multiple air layers isolate internal heat and flue gases within the furnace 404 and, thus, provide effective sealing. The ring seal 200 permits axial movement of the tube 302 therethrough. Thus, axial expansion and contraction of the tube 302 due to, for example, thermal expansion, is facilitated. In addition, use of the housing ring 202 and the retaining ring 206 allows the ring seal 202 to be installed, maintained, and replaced without removal or alteration of the furnace 404 or the tube 302.

Although various embodiments of the method and system of the present invention have been illustrated in the accompanying Drawings and described in the foregoing Specification, it will be understood that the invention is not limited to the embodiments disclosed, but is capable of numerous rearrangements, modifications, and substitutions without departing from the spirit and scope of the invention as set forth herein. It is intended that the Specification and examples be considered as illustrative only.

What is claimed is:

1. A ring-seal assembly comprising:
   a housing ring coupled to an outer surface of a furnace and disposed around a circumference of a catalyst tube proximate a junction with the furnace;

a plurality of split brush-seal rings at least partially disposed within the housing ring, the plurality of split brush-seal rings disposed around the circumference of the catalyst tube, each brush-seal ring of the plurality of split brush-seal rings comprising a single joint, wherein a joint of a first split brush-seal ring of the plurality of split brush-seal rings is arranged in a circumferentially staggered orientation from a joint of an adjacent split brush-seal ring of the plurality of split brush-seal rings; and the plurality of split brush-seal rings comprising a plurality of brushes extending radially inwardly towards the catalyst tube.

2. The ring-seal assembly of claim 1, comprising a retaining ring coupled to the housing ring.

3. The ring-seal assembly of claim 1, wherein the plurality of split brush-seal rings permits axial expansion of the catalyst tube due to thermal expansion.

4. The ring-seal assembly of claim 1, wherein the plurality of brushes contact an outer surface of the catalyst tube.

5. The ring-seal assembly of claim 1, wherein the plurality of brushes inhibits transmission of gases from the furnace.

6. The ring-seal assembly of claim 1, wherein the plurality of split brush-seal rings are seated within a rabbet formed in the housing ring.

7. A method of sealing a junction between a tube and a furnace, the method comprising:

installing housing ring to an outer surface of a furnace and about a circumference of a catalyst tube proximate a junction with the furnace;

installing a plurality of split brush-seal rings around the circumference of the catalyst tube and at least partially disposing the plurality of split brush seal rings within the housing ring, each brush seal ring of the plurality of split brush-seal rings comprising a single joint;

arranging the plurality of split brush-seal rings such that a joint of a first split brush-seal ring of the plurality of split brush-seal rings is circumferentially staggered from a joint of an adjacent split brush-seal ring of the plurality of split brush-seal rings; and contacting a plurality of brushes extending radially inwardly from the plurality of brush-seal rings with an outer surface of the catalyst tube.

8. The method of claim 7, comprising:
coupling a retaining ring to the housing ring.

9. The method of claim 7, wherein the installing the plurality of split brush-seal rings comprises wrapping the plurality of split brush-seal rings around the catalyst tube such that the plurality of split brush-seal rings may be installed and removed without removal of the catalyst tube.

10. The method of claim 7, wherein contact pressure between the brushes and the outer surface of the catalyst tube inhibits transmission of gases from the furnace.

11. The method of claim 7, wherein the seating the plurality of split brush-seal rings within the housing ring comprises disposing the plurality of split brush-seal rings within a rabbet formed in the housing ring.

* * * * *